INVENTORS
WILLIAM E. LOWREY
JOSEPH T. STEWART JR.

AGENT

Aug. 8, 1967  W. E. LOWREY ET AL  3,334,650
VALVE
Filed March 12, 1964  3 Sheets-Sheet 2
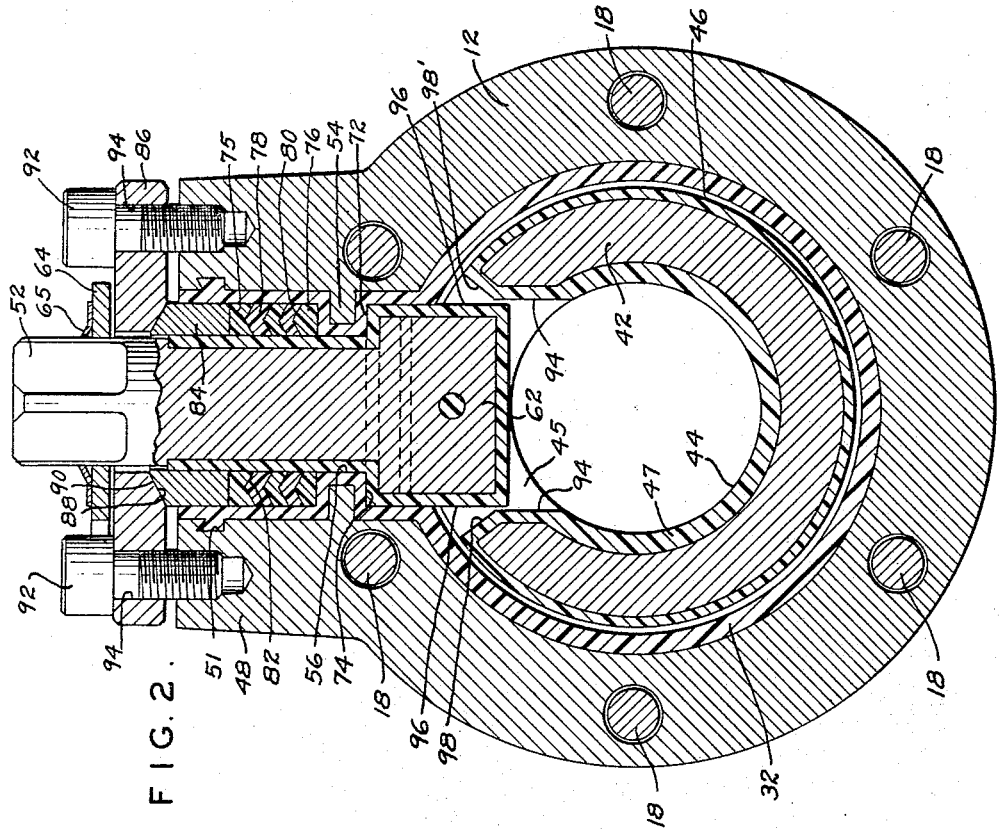
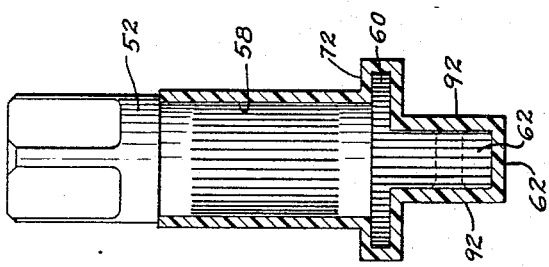
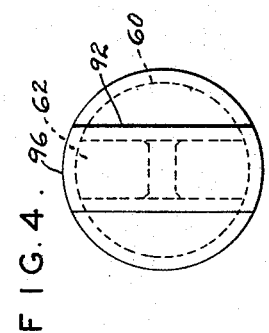
INVENTORS
WILLIAM E. LOWREY
JOSEPH T. STEWART JR.
BY
AGENT

United States Patent Office 3,334,650
Patented Aug. 8, 1967

3,334,650
VALVE
William E. Lowrey and Joseph T. Stewart, Jr., Houston, Tex., assignors to ACF Industries, Incorporated, New York, N.Y., a corporation of New Jersey
Filed Mar. 12, 1964, Ser. No. 351,421
8 Claims. (Cl. 137—375)

This invention relates generally to valves for controlling the flow of fluid and more specifically to a rotatable plug valve for controlling the flow of corrosive ladings having an internal wall structure and internal parts which are completely lined or covered with a material which is resistant to the corrosive action of virtually all chemical ladings.

In chemical and petro-chemical industries in particular, as well as in other process industries, the handling of corrosive liquids presents a serious problem. In the past, pipe systems for transporting corrosive fluids were constructed entirely of expensive so-called corrosion resistant metals such as stainless steel for example. Obviously corrosion resistant metal pipe systems involved considerable investment because of the expensive metals employed. To reduce costs in pipe systems, lined pipe was developed which was formed of inexpensive common construction metals such as carbon steels and lined with a thin inner conduit formed of corrosion resistant metals.

Replacement and repair costs of corrosion resistant metal pipe systems was extremely high because the metals employed were not completely chemically inert and would react with the corrosive lading causing deterioration of the pipe system. Replacement and repair of deteriorated corrosive resistant pipe systems obviously involved high costs in material and labor as well as involving serious production losses.

To control the flow of these corrosive ladings likewise presented similar corrosion problems in valves which were formely used in chemical and petro-chemical industries and in time valves were developed which were constructed from the same exotic metals employed in the construction of the pipe systems. While metal corrosion resistant valves had quite a long life in comparison to valves constructed of high carbon steel, nevertheless, in time deterioration occurred and replacement or repair of the valve was necessary. The cost of replacing or repairing deteriorated valves not only involved the cost of the repair or replacement of the valve but also involved production losses due to down time on the flow system.

Due to the expensiveness of the corrosion resistant metals from which the valves were constructed, the cost of a valve, composed in its entirety of corrosion resistant metals, was extremely high.

To reduce initial valve cost when employing stainless steel or other exotic alloy metal construction, valves were developed which were formed of carbon steel and having all of the interior parts thereof in contact with the lading coated or lined with a corrosion resistant metal of the type indicated. Lined valves were substantially less expensive than valves composed entirely of corrosive resistant metals but the operating life of this type of valve like the lined pipe was considerably shorter than what was needed in the industry.

The development of various substantially chemically inert plastic substances by the chemical industry opened a new era for transporting corrosive liquids. Pipes for utilization in process systems were developed which were coated or otherwise lined with plastic materials which are substantially inert to almost all chemicals, thereby extending the operating life of a process system. Due to the longevity of pipe systems which are so lined, a need was created for a valve lined with material which is also substantially chemically inert.

Inlined valves the practice has generally been to form a thin sleeve of the lining material about the inner surfaces of the end closure portions and about the inner surface of the body portion generally by the same methods employed in the manufacture of lined pipes. The liner may then be bonded to the surfaces if desired or it may merely fit the inner surfaces and be retained in position by the pressurized lading. Vent openings are formed in the walls of the end closure portions and the body portion of the valve to vent any air which might be trapped between the liner and the valve wall structure. If the lining in a vented body or end closure portion develops a leak it is obvious that the corrosive lading could flow from the vent opening. The condition could be quite dangerous in view of the nature of most chemical ladings. Also the lining could be forced away from the wall structure and into the valve bore where it would block or seriously retard the flow of fluids through the valve.

Accordingly, it is a primary object of this invention to provide a novel rotary plug valve formed of common structural metal and having inner lading contacting surfaces thereof which are substantially chemically inert with respect to most known chemical compositions.

It is a further object of this invention to provide a novel lined valve which is self-lubricating, obviating the need for lubricants.

A further object of this invention contemplates the provision of a novel lined rotary plug valve having a plug member suspended and supported between seat ring members.

An even further object of this invention includes the provision of a novel lined rotary plug valve having a plug operating stem and a plug member which is axially disengageable from the stem during normal valve operation.

It is a further object of this invention to provide a novel lined rotary plug valve wherein the lining material is fixed to the individual structural components of the valve to prevent separation of the lining material from these components.

A still further object of this invention contemplates the provision of a novel lined rotary plug valve having substantially chemically inert annular seat ring members which are separate from the lining and which may be easily and quickly replaced without the use of tools, if they should become worn.

An additional object of this invention is to provide a novel lined rotary plug valve including a stem and packing assembly wherein excessive stem packing loads are prevented and the valve stem is positively retained within the valve by the valve body structure.

Other and further objects of this invention will be obvious upon an understanding of the illustrative embodiments about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

FIGURE 2 is a sectional view taken along line 2—2 in FIGURE 1.

FIGURE 3 is an elevational view of the stem of the valve of FIGURE 1 with the lining material in section.

FIGURE 4 is a bottom view of the stem of the valve of FIGURES 1 and 3.

Briefly, the invention concerns a free floating spherical plug valve, which is completely internally lined with a self-lubricating chemically inert material for use in transporting highly corrosive ladings. The lined rotary plug valve has a through conduit design which offers no more appreciable resistance to the flow of fluid than an equal length of equal diameter pipe. The through conduit design of the valve allows no fluid turbulence to develop which would hamper the flow of fluid through the valve and would cause fluid erosion of the internal valve parts.

Figure 1:
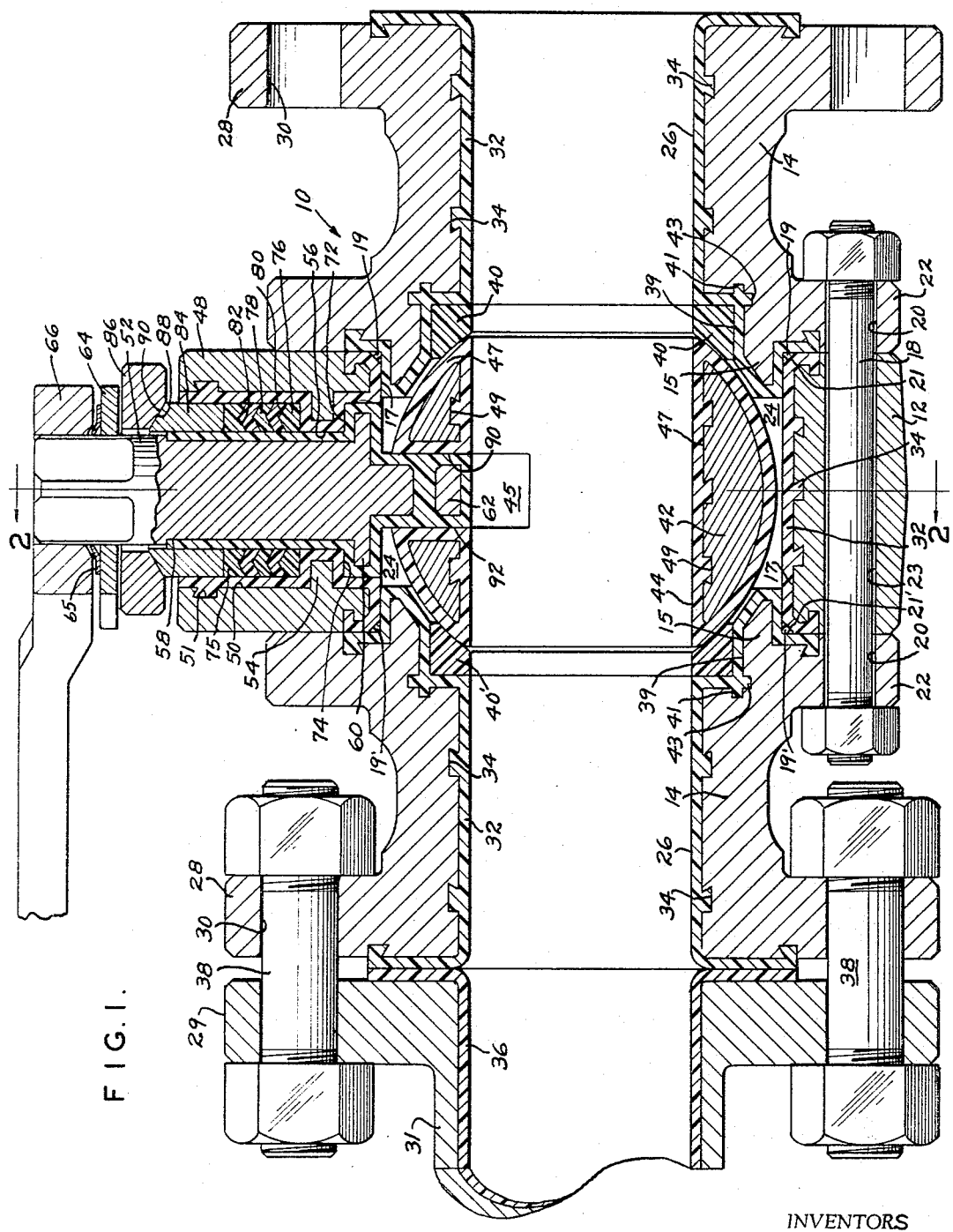
FIGURE 1 is an elevational view in section illustrating the valve in accordance with this invention.

Referring now to the drawings for a better understanding of the invention, a lined plug valve 10 is illustrated in FIGURES 1 and 2. The lined plug valve 10 (FIGURE 1) comprises a generally cylindrical body portion 12 having a fluid passage formed therethrough. A pair of end closure portions 14 are connected to the ends of the body portion 12 by a series of bolts 18 which extend through openings 20 in a flange 22 formed on each of the end closure members 14 and through openings 23 formed in the body portion 12.

The body portion 12 and each of the end closure portions are interiorly lined as described below with a corrosive resisting coating which may be a synthetic organic plastic such as fluorinated ethylene propylene, sold under the trademark "Teflon," by E. I. du Pont de Nemours & Co., for example. Any moldable lining material may be used, however, which is virtually inert to most known chemical ladings. In a two inch lined spherical plug valve a 3/32" thickness of lining material has been found quite satisfactory. This specific lining thickness is given herewith as illustrative and must not be taken as limiting in regard to this application. Materials such as fluorinated ethylene propylene or the like, while not required, are especially adapted for use in lined valves because of their self-lubricating properties. These materials obviate the need for additional lubrication, and yet allow serviceable transportation of most known corrosive fluids. An inwardly extending annular longitudinal flange 15 is formed on each of the end closure portions 14 and its coated surface closely fits the coated inner surface 17 of the body portion 12 to provide correct alignment between the end closure portions and the body portion as well as for strengthening the valve structure.

One of two annular substantially chemically inert sealing rings 19 and 19' coaxial with the flow passage is placed within an annular space defined by the walls of each end closure member 14 and an adjacent one of two beveled surfaces 21 and 21' on the body portion 12. The annular sealing rings 19 and 19' are larger in cross section than the cross sectional area of the respective space in which they are positioned so that the sealing rings 19 and 19' are maintained under compression and establish a fluid-tight seal when the body portion and the end closure portions are drawn tightly together by the bolts 18. The end closure portion defines, with the body portion, a valve chamber 24. A flow passage 26 formed in each of the end closure portions 14 communicates with the valve chamber 24 to define a flow passage through the valve. The end of each closure portion remote from the body portion 12 is formed with a flange 28 having a series of openings 30 formed therein for connecting the valve 10 to the flange 29 a lined pipe system 31 as illustrated in FIGURE 1. Obviously other well-known means of attachment of the valve to a lined pipe system may be employed without departing from the spirit or scope of this invention.

As illustrated in FIGURE 1, the lining 32 is formed to the inner surfaces of the body portion 12 and each of the end closure members 14 by any one of several well-known methods. For example, tubes of the plastic material may be inserted into the unassembled body portion or end closure portions and then subjected to heat and pressure to form the material to the interior surfaces of these portions. A second method of forming the lining material to the various structural elements of the valve involves locating the element within a specially prepared mold, pouring into the mold finally granulated plastic material, and then subjecting the mold to heat and pressure to coalesce or fuse the granulated material into a solid impermeable mass of the specific form desired. Neither of the above methods of forming the lining to the valve elements is critical, however, and neither of these methods forms a part of this invention. The lining is retained in position by annular grooves 34 undercut into the interior walls of the body portion and the end closure portions. The lining material 32 is formed to partially cover a portion of the flanges 28 and is retained against displacement from the flange 28 by abutment with the lining 36 of the lined pipe 31 to which the valve 10 is bolted. The lining material of the pipe 31 and the valve 10 are pressed into tight sealing contact by the bolts 38 to prevent leakage of the lading through the joint between the valve and the pipe. The lining material of the end closure portions formed about the annular longitudinal flange 15 and a portion of the flange 22 and is retained in position by abutment with the lining of the body portion 12.

An annular seat recess 39 is formed into each of the end closure portions 14 about the flow passage 26. The lining material 32 is formed into the seat recess 39 and is retained against separation from the interior wall of the end closure portion by a longitudinal annular groove 41 and an annular radial groove 43 undercut into the interior wall of each of the end closure members 14. The lining material is formed within the axial and radial annular grooves 41 and 43, respectively, and is thereby interlocked into the seat recess against axial or radial separation from the end closure member 14.

Annular substantially chemically inert seat members 40 and 40' are loosely positioned within each of the seat recesses.

A generally spherical plug member 42 is positioned within the valve chamber 24 and is retained in a centered position within the valve chamber 24 by light sealing engagement with the seat members 40 and 40'. The plug member 42 is formed with a through passage 44 therein which is alignable with the flow passage 26 of the end closure member 14 in the open position of the plug. A solid portion 46 (FIGURE 2) of the plug member 42 is adapted to block the through passage 26 when the plug is rotated to the closed position thereof.

A plurality of annular grooves 49 are undercut into the wall of the through passage 44 of the plug member 42. A drive opening 45 is formed into the upper portion of the plug member 42 and cooperates with a valve stem, as discussed hereinbelow to impart rotation to the plug member. A lining 47 of substantially chemically inert material, of substantial thickness is formed about the internal and external surfaces of the plug member and serves to prevent corrosion of the plug member by the lading. The lining material is formed into the grooves 49 and within the drive opening 45 to interlock the lining with the plug member to prevent separation of the lining and the plug wall structure. The plug member 42 is preferably lined with the same substantially chemically inert material with which the body and end closure members are lined, but it may be lined with other substantially chemically inert materials, as desired.

An external boss 48 formed on the body portion 10 is formed with a bore 50 for receiving a valve stem 52 and a packing assembly. An annular stem retainer flange 54 is formed integral with the body member 10 and forms an aperture 56 through which the lined stem 52 extends. The lining of the body portion also extends into and lines the interior walls of the bore 50 and the flange 54. Annular groove structure 51 is also undercut into the surface of the bore 50 to prevent separation of the lining material and the wall structure.

The valve stem member 52 is formed with a substantially cylindrical reduced diameter portion 58, an enlarged annular support flange 60 and a noncircular plug drive portion 62, all of which are lined with a considerable thickness of substantially inert material. As illustrated in FIGURE 3, the surfaces of the lined portions of valve stem 52 are formed with a straight knurl to prevent rotation of the lining material about the stem as the stem is rotated to rotate the plug 42. The valve stem 52 includes an upper noncircular portion 61 on which is retained a position indicator plate 64, which is retained in position by a light spring member 65 (FIGURE 2). An operating handle 66 is also positioned on the noncircular portion of the support flange 60 for manual operation of the valve. Obviously, any of the various well-known types of valve operators, such as mechanical, electrical, hydraulic, etc., may be employed to impart rotary movement to the valve stem 52 and the plug 42. The drive portion 62 of the stem 52 is nonrotatably fitted into the lined drive opening 45, formed in the plug member 42 and, upon rotation of the stem, imparts rotary movement to the plug member 42.

The lined stem member 52 is fitted into the bore 50 so that an upper shoulder 72 defined by the lined flange 60 on the stem 52 engages a lower annular shoulder 74 defined by the flange 54 on the body portion 12. The engagement between the shoulder 72 of the stem flange 60 and the shoulder 74 of the flange 54 of the body portion establishes a structural support to positively retain the stem within the bore 50 of the body portion 12 and to prevent excessive stem packing loads. An upper annular packing retainer ring 75 and a lower annular packing retainer ring 76 are positioned within the packing chamber defined about the portion 58 of the stem member 52. A plurality of annular chevron type packings 78 are positioned about the valve stem 52 and between the upper and lower packing retainer rings and serve to establish a fluid-tight seal between the stem 52 and the body portion 12. The upper surface 80 of the lower packing retainer ring 76 is shaped to mate with the lower surface of the lower chevron packing and the lower surface 82 of the upper packing retainer 75 ring is shaped to mate with the upper surface of the upper chevron packing to retain the chevron packings in their proper shape within the annular chamber. Both of the retainer rings 75 and 76 and the packings 78 are preferably formed of relatively chemically inert material such as polytetrafluoroethylene resin, for example.

An annular pressure ring 84 is positioned about the stem 52 and bears against the upper surface of the upper packing retainer ring 74 to retain the chevron packings under compression. The chevron packings, when under compression, tend to flatten, thus forcing the inner and outer surfaces thereof into tight sealing engagement with the stem and the packing chamber wall to effect a fluid-tight seal. A bonnet cap 86 is formed within an inner conical wall 88 which mates with an exterior conical wall 90 on the pressure ring 84 to maintain accurate alignment between the pressure ring and the cap. The cap 86 is adjustable by turning adjustment bolts 92 (FIGURE 2) which extend through apertures 94 formed in the cap 86 and threadedly engage the body portion 12 to force the pressure ring 84 into the chamber to pressurize the packing assembly. As wear occurs on the stem lining or on the chevron packings due to rotation of the stem 54, the chevron packings will spread to compensate for the wear while maintaining a tight seal. When the packing or the stem lining wears an amount sufficient that leakage occurs, the operator merely adjusts the bolts 92 to repressurize the packing assembly.

In free floating plug valves, which employ a laterally disengageable plug-stem connection and which are composed entirely of metals or other hard materials, the fit between the drive portions of the stem and plug is not critical. The stem drive member of this type of plug valve generally fits loosely within the plug drive opening so that the torque required to rotate the plug member is transmitted between the stem and the plug member through a single line of contact at the ends of the plug drive portion. In metal plug valves, loose fit construction is acceptable because the metal from which the valve is constructed has sufficient strength to resist deformation.

Figure 5:
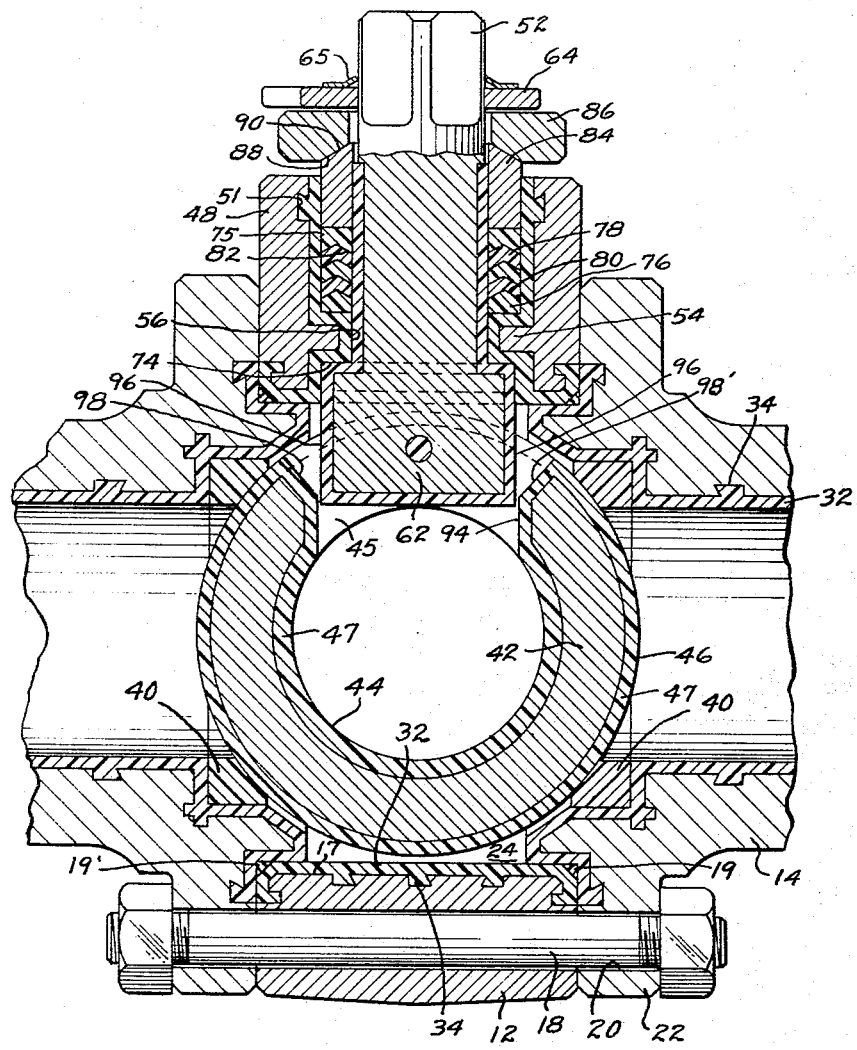
FIGURE 5 is a partial elevational view in section illustrating the valve of FIGURE 1 in its closed position.

In accordance with a feature of this invention, the stem 52 is provided with a lined male drive portion 62 having a generally rectangular shape. As illustrated in FIGURES 2 and 5 the lined drive opening 45 in the plug 42 and the lined drive portion 62 of the stem member 52 cooperate to allow movement of the plug member relative to the stem when the plug is in the closed position. In accordance with a feature of this invention, the lined drive opening 45 in the plug member is formed with vertical parallel side surfaces 90, which are adapted for sliding engagement with the parallel surfaces 92 of the drive portion of the stem 52. This construction allows the torque required to rotate the plug member to be absorbed throughout one-half of the entire area of surface contact between the stem and the plug member and prevents deformation of the plastic lining material which would tend to cause excessive lining wear. Vertical surfaces 94 in the plug 42 form end walls for the drive opening 45 and are spaced a slightly greater distance than the length of the drive portion 62 of the stem 52. This spacing allows the surfaces 96 of the stem drive portion to be slightly spaced from the surfaces 94 of the drive opening when the drive portion of the stem is centered relative to the drive opening 45 in the plug member 42. The parallel surfaces 92 of the drive portion 62 of the stem 52 extend normal to the axis of the bore 44 in the plug 42 so that, in the open position of the valve (FIGURE 2), the stem will serve to maintain the plug member in a centered position within the valve chamber 24. When the plug is rotated to the closed position, the lading under line pressure, will apply a force on the plug tending to move the plug downstream. Since the length of drive opening between surfaces 94 is greater than the length of the drive portion 62 and since the surfaces 90 and 92 have a sliding fit, the plug member 42 will patrially disengage from the stem and will be allowed to move slightly downstream until it establishes a tight sealing engagement with the downstream seat ring 40. Movement of the plug member 42 downstream will be slight because, as described above, when the valve is in the open position, the plug lightly engages each of the two annular seat members 40. When the valve is closed the plug 42 will be moved by line pressure only an amount sufficiently to compensate for compression of the downstream seat member 40 and to compensate for any wear that has occurred on the seat member 40 or the plug lining.

As illustrated in FIGURE 2, the drive opening 94 is lengthened at its upper extremity by the diagonal surfaces 98 and 98' so that the plug member 42 is allowed to rotate slightly with respect to the stem 52 around an axis normal to the conduit passage when the plug 42 is in closed position. This arrangement allows the plug member to not only move laterally but also to rotate sufficiently to seek a proper sealing engagement with the downstream seat even though the seat and plug may be slightly misaligned.

Operation: Assuming that the line in which the valve 10 is positioned is unpressurized and the valve is in the open position with the bore 44 in the plug member 42 aligned with the flow passages 26, the plug 42 will be centered in the valve chamber 24 by light engagement with each of the seat members 40. As the flow of lading through the valve begins from either direction, the lading will flow into the valve chamber 24 as well as through the bore 44 in the plug 42 and a balanced pressure condition will exist causing the plug to remain in its centered position as described above.

When rotation of the plug member 42 from the closed to the open position is desired, the operator will grasp the operating handle 66 and rotate the stem member 52 which, through the drive connection with the plug member, rotates the plug member to the open position. The plug member even though it is not centrally located within the valve chamber 24, will be rotated through its partially disengaged connection with the stem 52 until the through passage in the plug member 42 is aligned with the flow passages 26 in the end closure portions 14. When the plug member 42 rotates to the open position, there will be no line forces, except for the pressure drop through the valve, acting on the plug member to force it toward the downstream side of the valve. The downstream seat member will expand slightly to its normal condition causing the plug member to move upstream to a substantially centered position within the valve chamber. As was indicated above, when the plug member is in its centered position it will be in light sealing engagement with both the upstream and downstream seat members.

Since the plug member is allowed to freely rotate into sealing engagement with the downstream seat, rather than being merely moved laterally by the lading under line pressure, the steam connection therewith adapts the plug member to be easily rotated from its closed position to its open position. The partially disengageable connection between the stem member and the plug member prevents binding of the plug member or stem member which might occur if the plug member were merely moved laterally by the lading.

Because the plug member partially disengages from the stem as described above, there are no side thrust loads applied to the stem which would cause excessive wear to the stem packing assembly. Therefore, the specific stem plug connection not only permits positive sealing by allowing axial and rotary movement of the plug member but also prevents excessive packing wear by preventing the application of side thrust loads on the stem 52.

During rotary movement of the plug member 42, the plug will engage the seat members 40 only and there will be no contact between the lined plug and the lining material which might cause wear on the lining. The seat members and the plug member, when worn, may be replaced simply and easily without the use of special tools.

From the foregoing, it will be seen that this invention is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or as shown in the accompanying drawings is to be interpreted as illustrative and not in a limiting sense.

We claim:

1. A lined rotary plug valve comprising an annular body portion, end closure portions having a flow passage formed therein removably fixed to said body portion and defining with said body portion a valve chamber, substantially inert lining material formed about the interior surfaces of said body portion and said end closure portions, the lining material of each of said end closure portions defining annular seat recesses about the flow passages thereof, removable seat members composed of substantially inert material positioned one within each of said seat recesses, a rotary plug member having a through passage formed therein positioned within said valve chamber and in sealing engagement with each of said seat members, substantially inert lining material formed about the interior and exterior surfaces of said plug member and defining an elongate drive opening, a lined valve stem having a noncircular portion thereof positioned within said slot for imparting rotation to said plug member, the length of said drive opening being greater than the length of said noncircular portion thereby restraining movement of said plug member in one position of said plug and allowing free axial movement of the plug member in a second position thereof, substantially inert material formed about the external surfaces of said stem, means interlocking said lining material with said body portion, with said end closure portions and with said plug member to prevent separation of the lining material.

2. A lined rotary plug valve comprising an annular body portion, end closure portions each having a flow passage formed therein fixed to said body portion and defining, with said body portion, a valve chamber, corrosion resisting material formed about the inner wall of said body portion and each of said end closure portions, said corrosion resisting material defining opposed annular seat recesses about said flow passages, annular corrosion resisting seat members positioned within said seat recesses, said valve chamber and about said flow passages, a rotary plug member having a through passage formed therein positioned within said valve chamber, corrosion resistant material formed about the interior and exterior surfaces of said plug member, a bore in said body portion lined with corrosion resisting material and defining a stem packing chamber, a stem packing assembly positioned within said packing chamber, a valve stem member lined with corrosion resisting material and extending through the packing chamber and having a portion thereof in engagement with the plug member for imparting rotation thereto, said stem being in sealing engagement with said packing assembly, an annular internal flange within said bore defining a wall of said packing chamber, an external annular flange on said stem engaging said internal flange to positively retain said stem within said body and to prevent excessive stem packing loads.

3. A lined rotary plug valve comprising an annular body portion, end closure portions each having a flow passage formed therein fixed to said body portion and defining, with said body portion, a valve chamber, corrosion resisting material formed about the inner wall of said body portion and each of said end closure portions, the lining material of each end closure portions defining annular seat recesses disposed about the flow passages thereof, removable annular seat members formed of corrosion resisting material positioned one within each of said seat recesses, a rotary plug member having a through passage formed therein positioned within said valve chamber, a bore formed in said body portion defining a stem packing chamber, corrosion resisting material formed within said bore, a stem packing assembly positioned within said packing chamber, a valve stem member having the exterior surfaces thereof lined with corrosion resisting material extending through the packing chamber and having a portion thereof in engagement with said plug member to impart rotation thereto, said stem being in sealing engagement with said packing assembly, said corrosion resisting material within said bore forming an annular internal flange within said bore defining a wall of said packing chamber and providing a support for said stem, an external annular flange formed on said stem by said stem lining and engaging said internal flange with said bore to positively retain the stem within said body and to prevent excessive packing loads, corrosion resisting material formed about the interior and exterior surfaces of said plug member, means interlocking said corrosion resisting material with the wall structure of the body portion, end closure portions and the valve member.

4. A lined rotary plug valve comprising an annular body portion having generally parallel annular end surfaces, a bore formed in said body portion, an annular groove formed in each of said end surfaces, substantially inert lining material formed about the interior surfaces of said body portion and said bore and within each annular groove, a pair of end closure members each having a flow passage formed therein and annular planar surfaces thereon, said end closure members closing the ends of said body portion and defining with the body portion a valve chamber, an annular flange formed on each of the end closure members and being concentric with the respective flow passage and extending beyond one of said parallel end surfaces and into said body portion, substantially inert lining material formed about the interior of said end portions, about said annular flange of each of said end closure portions and about at least a portion of each of said annular planar surfaces, said lining material of said end closure portions defining annular seat recesses disposed about the respective flow passage, the lining material of each of the annular flanges being in contact with the lining material of said body portion, means establishing a seal between said end closure portions and said body portion, an annular seat member positioned within one within each of said seat recesses, a rotary plug member having a through passage formed therein positioned within said valve chamber and being supported in spaced relation from said valve chamber walls by said seat members, said plug member being internally and externally lined with corrosion resistant material and defining an elongated drive opening disposed in generally normal relation with said through passage, an externally lined stem member extending through said body portion and having a noncircular portion thereof interfitting within said drive opening, said drive opening being greater in length than said noncircular portion of said stem allowing shifting of said plug in a downstream direction in the closed position thereof.

5. A lined rotary plug valve comprising an annular body portion defining a body bore and having generally parallel annular end surfaces, a stem passage formed in said body portion, an annular groove formed in each of said end surfaces, substantially inert lining material formed about the interior surfaces of said body portion and said bore and within each annular groove, a pair of end closure members each having a flow passage formed therein and annular planar surfaces thereon, said end closure members closing the ends of said body portion and defining with the body portion a valve chamber, an annular flange formed on each of the end closure members and being concentric with the respective flow passage and extending beyond one of said parallel end surfaces and into said body bore, substantially inert lining material formed about the interior of said end portions, about said annular flange of each of said end closure portions and about at least a portion of each of said annular planar surfaces, the lining material of each of the annular flanges being in contact with the lining material of said body portion, a pressure actuated sealing member positioned between said end closure portions and said body portion to establish a seal therebetween, said lining material defining annular seat recesses formed within said annular flange in each of said end closure portions and surrounding said flow passages, an annular substantially inert seat member positioned in each of said seat recesses, a rotary plug member positioned within said valve chamber and being supported in spaced relation from said valve chamber walls by said seat members, a valve stem positioned within said stem passage and having a portion thereof in engagement with said plug member for imparting rotation to the same, said valve stem being lined with substantially inert material.

6. A lined rotary plug valve comprising an annular body portion defining a body bore having generally parallel annular end surfaces, a stem passage formed in said body portion, an annular groove formed in each of said end surfaces, substantially inert lining material formed about the interior surfaces of said body portion and said bore and within each annular groove, a pair of end closure members each having a flow passage formed therein and annular planar surfaces thereon, said end closure members closing the ends of said body portion and defining with the body portion a valve chamber, an annular flange formed on each of the end closure members and being concentric with the respective flow passage and extending beyond one of said parallel end surfaces and into said body bore, substantially inert lining material formed about the interior of said end portions, about said annular flange of each of said end closure portions and about at least a portion of each of said annular planar surfaces, the lining material of each of the annular flanges being in contact with the lining material of said body portion, said lining material of said end closure members defining annular seat recesses surrounding said flow passages, an annular seat member formed of substantially inert material positioned in each of said seat recesses, a rotary plug member being interiorly and exteriorly lined with substantially inert material positioned within said valve chamber and being supported in spaced relation from said valve chamber walls by said seat members, said plug lining defining a noncircular drive opening, a valve stem positioned within said bore and having a plug drive portion thereof in engagement with said noncircular opening of said plug member for imparting rotation to the plug member, said valve stem being lined with substantially inert material, said noncircular opening being of greater length than the length of said plug drive portion of said stem whereby said plug member is allowed to move relative to said stem in the closed position of said valve annular grooves undercut into the interior wall structure of the body portion, the end closure portions and the plug member, said lining material being formed into said grooves to interlock the lining material with the valve structure.

7. A lined rotary plug valve comprising an annular body portion, end closure portions having a flow passage formed therein removably fixed to said body portion and defining with said body portion a valve chamber, substantially chemically inert material formed about the interior surfaces of said body portion and said end closure portions, seat members composed of substantially chemically inert material positioned about each of said flow passages within said valve chamber, a rotary plug member having a through passage formed therein positioned within said valve, said plug member formed with a generally rectangular drive opening, a contiguous covering of substantially chemically inert material formed internally and externally of said plug and defining parallel side surfaces within said drive opening, a rotatably mounted valve stem extending through said valve body and having a drive portion thereof extending into said plug drive opening, a contiguous lining of substantially chemically inert material formed about said stem and defining parallel drive surfaces disposed in sliding engagement with said side surfaces of said drive opening, whereby the force required to impart rotation to the plug member is absorbed by at least one-half of the total combined surface area of said side surfaces.

8. A lined rotary plug valve comprising an annular body portion, end closure portions having a flow passage formed therein removably fixed to said body portion and defining with said body portion a valve chamber, substantially chemically inert material formed about the interior surfaces of said body portion and said end closure portions, seat members composed of substantially chemically inert material positioned about each of said flow passages within said valve chamber, a rotary plug member having a through passage formed therein positioned within said valve, said plug member formed with a generally rectangular drive opening, a contiguous covering of substantially chemically inert material formed internally and externally of said plug and defining parallel side surfaces within said drive opening extending normally with said bore, a rotatably mounted valve stem extending through said valve body and having a drive portion thereof extending into said plug drive opening, a contiguous lining of substantially chemically inert material formed about said stem and defining parallel drive surfaces disposed in sliding engagement with said side surfaces of said drive opening, whereby the force required to impart rotation to the plug member is absorbed by at least one-half of the total combined surface area of said side surfaces, said side surfaces having greater length than said parallel drive surfaces whereby said plug member is allowed to move in the downstream direction in the closed position thereof.

References Cited
UNITED STATES PATENTS

| | | | |
|---|---|---|---|
| 404,392 | 6/1889 | Egner et al. | 137—375 |
| 941,351 | 11/1909 | Smith | 137—375 |
| 1,258,903 | 3/1918 | Howard | 137—375 |
| 1,653,202 | 12/1927 | Bubla | 137—375 X |
| 1,779,503 | 10/1930 | Swindini | 137—375 |
| 1,827,266 | 10/1931 | Shipley | 137—375 |
| 1,947,257 | 2/1934 | Fritz et al. | 137—375 |
| 1,992,043 | 2/1935 | Saunders | 137—375 |
| 1,998,882 | 4/1935 | Merrill | 137—375 |
| 3,009,680 | 11/1961 | Kaiser | 251—317 X |
| 3,024,802 | 3/1962 | Stillwagon | 137—375 |
| 3,073,336 | 1/1963 | Johnson | 137—375 |

FOREIGN PATENTS

| | | |
|---|---|---|
| 1,260,940 | 4/1961 | France. |

M. CARY NELSON, *Primary Examiner.*

HENRY T. KLINKSIEK, *Examiner.*